United States Patent
Tallon

(10) Patent No.: US 7,455,100 B2
(45) Date of Patent: Nov. 25, 2008

(54) COOLING SYSTEM HAVING A PIVOTAL HEAT EXCHANGER

(75) Inventor: David D. Tallon, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 11/167,136

(22) Filed: Jun. 28, 2005

(65) Prior Publication Data

US 2006/0289143 A1 Dec. 28, 2006

(51) Int. Cl.
*B60H 1/00* (2006.01)
*B60H 3/00* (2006.01)
*F01P 3/18* (2006.01)
*B60K 11/04* (2006.01)
*E02F 9/00* (2006.01)

(52) U.S. Cl. ............... 165/41; 165/51; 165/67; 165/77; 165/86; 165/95; 165/140; 123/41.33; 123/563; 60/599; 180/68.1

(58) Field of Classification Search .......... 165/51, 165/95, 41, 77, 86, 140, 67; 123/563, 41.33; 60/599; 180/68.1, 68.4
See application file for complete search history.

(56) References Cited

U.S. PATENT DOCUMENTS 1,927,991 A    9/1933   Pendleton
3,485,293 A   12/1969   Zoltok
3,834,478 A *  9/1974   Alexander et al. ............ 165/77
3,970,164 A    7/1976   Suzuki
4,076,072 A    2/1978   Bentz
4,531,574 A *  7/1985   Hoch .......................... 165/67
4,825,815 A    5/1989   Turner
4,832,116 A    5/1989   Easton
5,492,167 A    2/1996   Glesmann
6,105,660 A *  8/2000   Knurr .......................... 165/77
2004/0226683 A1  11/2004  Esposito et al.

FOREIGN PATENT DOCUMENTS

DE   3545336 A1 *  7/1987
EP    369148 A2 *  5/1990
GB   2 244 550     12/1991
GB   2 345 955      7/2000
JP   2001012244 A * 1/2001
JP   2001341533 A * 12/2001
JP   2002371844 A * 12/2002

* cited by examiner

*Primary Examiner*—John K Ford
(74) *Attorney, Agent, or Firm*—Finnegan, Henderson, Farabow, Garrett & Dunner

(57) ABSTRACT

A cooling system for a work machine is disclosed. The cooling system has a heat exchanger pivotally connected along a pivot axis. The cooling system also has a first fluid conduit and a second fluid conduit. The first fluid conduit is connected to a first end of the heat exchanger at the pivot axis. The second fluid conduit is connected to the heat exchanger at a second end opposite the first end.

10 Claims, 2 Drawing Sheets

COOLING SYSTEM HAVING A PIVOTAL HEAT EXCHANGER

TECHNICAL FIELD

The present disclosure relates generally to a cooling system and, more particularly, to a cooling system having a pivotal heat exchanger.

BACKGROUND

Work machines having a power source, such as an internal combustion engine, may also include a cooling system to cool fluids directed into or out of the power source. For example, a work machine power source may be fluidly connected to a liquid-to-air or air-to air heat exchanger to cool liquids circulated throughout the power source, or air directed into the power source. These heat exchangers may be located close together and/or close to the power source to conserve space on the work machine. In some situations, it may be necessary to clean debris from between the heat exchangers and/or between the heat exchangers and the power source. However, because of the close mounting configuration, it may be difficult to access the area requiring the cleaning operation.

One method of providing service access to the heat exchanger area is described in U.S. Pat. No. 5,492,167 (the '167 patent) issued to Glesmann on Feb. 20, 1996. The '167 patent describes an internal combustion engine provided with a liquid-to-air radiator that is coupled to an air-to-air radiator. The liquid-to-air radiator is provided with a liquid path for cooling the engine, while the air-to-air radiator is provided with an air path extending from a turbocharger into the engine for cooling the intake air. The liquid path includes a flexible upper hose and a flexible lower hose. The air path includes an intake pipe and an outgoing pipe. Immediately along side of the liquid-to-air heat exchanger is provided an upright pivotal hinge connected to framework of the engine. The coupled liquid-to-air and air-to-air heat exchangers may be pivoted away from the engine after disjointing the intake and outgoing pipes to provide access to the engine.

Although the system of the '167 patent may improve service access to the heat exchanger area, the access provided may be limited, time consuming to obtain, and detrimental to the engine. In particular, even though the heat exchangers of the '167 patent may pivot away from the engine, they are still coupled together, with no way to clean between them. In addition, in order to obtain the service access provided by the upright pivot of the '167 patent, the intake and outgoing pipes must be disjointed. The process of disjointing, in addition to consuming both work machine and service technician time, may also allow for the introduction of debris into the disjointed pipes. This introduction of debris could be damaging to the components of the engine.

The disclosed cooling system is directed to overcoming one or more of the problems set forth above.

SUMMARY OF THE INVENTION

In one aspect, the present disclosure is directed to a cooling system. The cooling system includes a first heat exchanger having a pivot axis. The cooling system also includes a first fluid conduit and a second fluid conduit. The first fluid conduit is connected to a first end of the heat exchanger at the pivot axis. The second fluid conduit is connected to the heat exchanger at a second end opposite the first end.

In another aspect, the present disclosure is directed to a method of servicing a cooling system having a heat exchanger. The method includes pivoting the heat exchanger along a pivot axis. The heat exchanger has a first fluid conduit connected to a first end of the heat exchanger at the pivot axis and a second fluid conduit connected to the heat exchanger at a second end opposite the first end. The first and second fluid conduits remain connected to the heat exchanger during pivoting.

DETAILED DESCRIPTION

Figure 1:
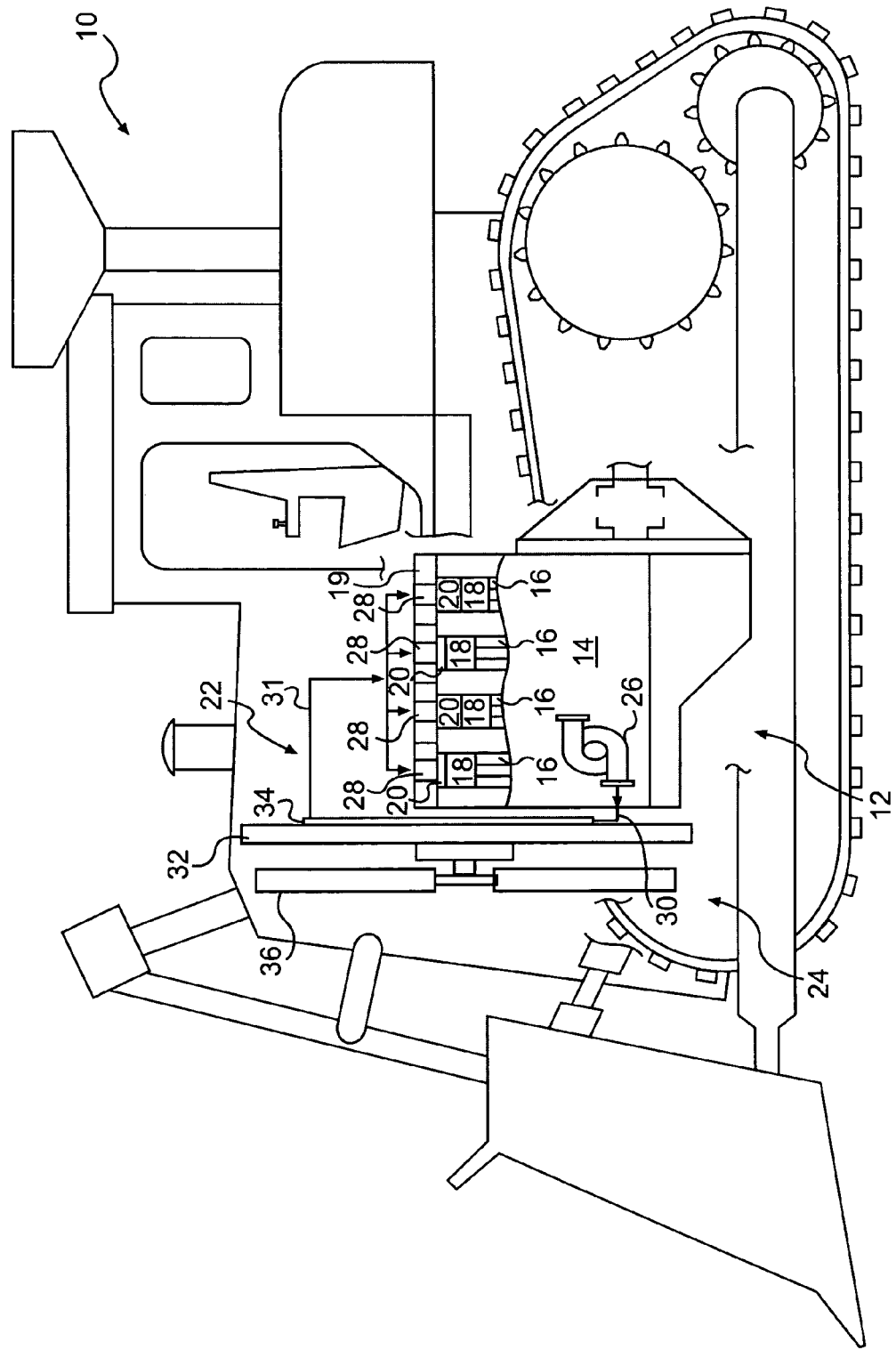
FIG. 1 is a diagrammatic illustration of a work machine having an exemplary disclosed cooling system.

FIG. 1 illustrates a work machine 10 having an engine 12. Work machine 10 may perform some type of operation associated with an industry such as mining, construction, farming, power generation, or any other industry known in the art. For example, work machine 10 may embody an earth moving machine such as a dozer, a loader, a backhoe, an excavator, a motor grader, a dump truck, or any other suitable earth moving machine. Work machine 10 may alternatively embody a generator set, a pump, or another operation-performing work machine.

Engine 12 may include multiple components that cooperate to produce a power output. In particular, engine 12 may include an engine block 14 that defines a plurality of cylinders 16, a piston 18 slidably disposed within each cylinder 16, and a cylinder head 19 associated with each cylinder 16. It is contemplated that engine 12 may include additional or different components such as, for example, a valve mechanism associated with cylinder head 19, one or more fuel injectors, and other components known in the art. For the purposes of this disclosure, engine 12 is depicted and described as a four-stroke diesel engine. One skilled in the art will recognize, however, that engine 12 may be any other type of internal combustion engine such as, for example, a gasoline or a gaseous fuel-powered engine.

Cylinder 16, piston 18, and cylinder head 19 may form a combustion chamber 20. In the illustrated embodiment, engine 12 includes four combustion chambers 20. However, it is contemplated that engine 12 may include a greater or lesser number of combustion chambers 20 and that combustion chambers 20 may be disposed in an "in-line" configuration, a "V" configuration, or any other suitable configuration.

As also shown in FIG. 1, engine 12 may include one or more systems that facilitate production of the power output. In particular, engine 12 may include an air induction system 22 and a cooling system 24. It is contemplated that engine 12 may include additional systems such as, for example, a fuel system, a lubrication system, a transmission system, a control system, and other such engine systems that are known in the art.

Air induction system 22 may include a means for introducing charged air into combustion chambers 20 of engine 12. For example, air induction system 22 may include one or more compressors 26 (only one illustrated in FIG. 1) in fluid communication with one or more inlet ports 28 of cylinder head 19. It is contemplated that additional and/or different components may be included within air induction system 22 such as, for example, one or more air cleaners, one or more waste gates, a control system, and other means known in the art for introducing charged air into combustion chambers 20.

Compressors 26 may be configured to compress the air flowing into engine 12 to a predetermined pressure level. Compressors 26 may be disposed in a parallel relationship and fluidly connected to inlet ports 28 via a first fluid conduit 30 and a second fluid conduit 31. Each of compressors 26 may embody a fixed geometry compressor, a variable geometry compressor, or any other type of compressor known in the art. It is contemplated that compressors 26 may alternatively be disposed in a series relationship or that air induction system 22 may include only a single compressor 26. It is further contemplated that compressors 26 may be omitted, when a non-pressurized air induction system is desired.

Cooling system 24 may include components that collaborate to cool fluids directed through engine 12. For example, cooling system 24 may include a liquid-to-air heat exchanger 32 configured to cool a heat transferring liquid circulated throughout engine 12, a plurality of co-planar air-to-air heat exchangers 34 (only one illustrated in FIG. 1) configured to cool the compressed air from compressors 26 before the air enters combustion chambers 20, and a fan 36 configured to generate a flow of air across the heat exchangers. It is contemplated that cooling system 24 may include additional and/or different components such as, for example, an oil cooler, an exhaust cooler, one or more valve mechanisms, one or more flow meters, and other cooling system components known in the art.

Liquid-to-air heat exchanger 32 may facilitate the transfer of heat to or from a heat transferring liquid circulated throughout engine 12. For example, liquid-to-air heat exchanger 32 may include a tube and shell type heat exchanger, a plate type heat exchanger, or any other type of heat exchanger known in the art. Liquid-to-air heat exchanger 32 may be connected to engine 12 via a supply conduit (not shown) and a return conduit (not shown). It is contemplated that liquid-to-air heat exchanger 32 may function as the main radiator of engine 12 dedicated to conditioning only the heat-transferring liquid supplied to engine block 14 or, alternatively, the engine oil cooler, the transmission oil cooler, the brake oil cooler, or any other cooling component of engine 12.

The heat-transferring medium may be a low-pressure fluid. Exemplary low-pressures fluids may include, for example, water, glycol, a water-glycol mixture, a blended air mixture, a power source oil such as transmission oil, engine oil, brake oil, or diesel fuel, or any other low-pressure fluid known in the art for transferring heat.

Air-to-air heat exchangers 34 may facilitate the transfer of heat to or from the air compressed by compressors 26, prior to the compressed air entering combustion chambers 20. For example, each air-to-air heat exchanger 34 may include a tube and shell type heat exchanger, a plate type heat exchanger, or any other type of heat exchanger known in the art.

Figure 2:
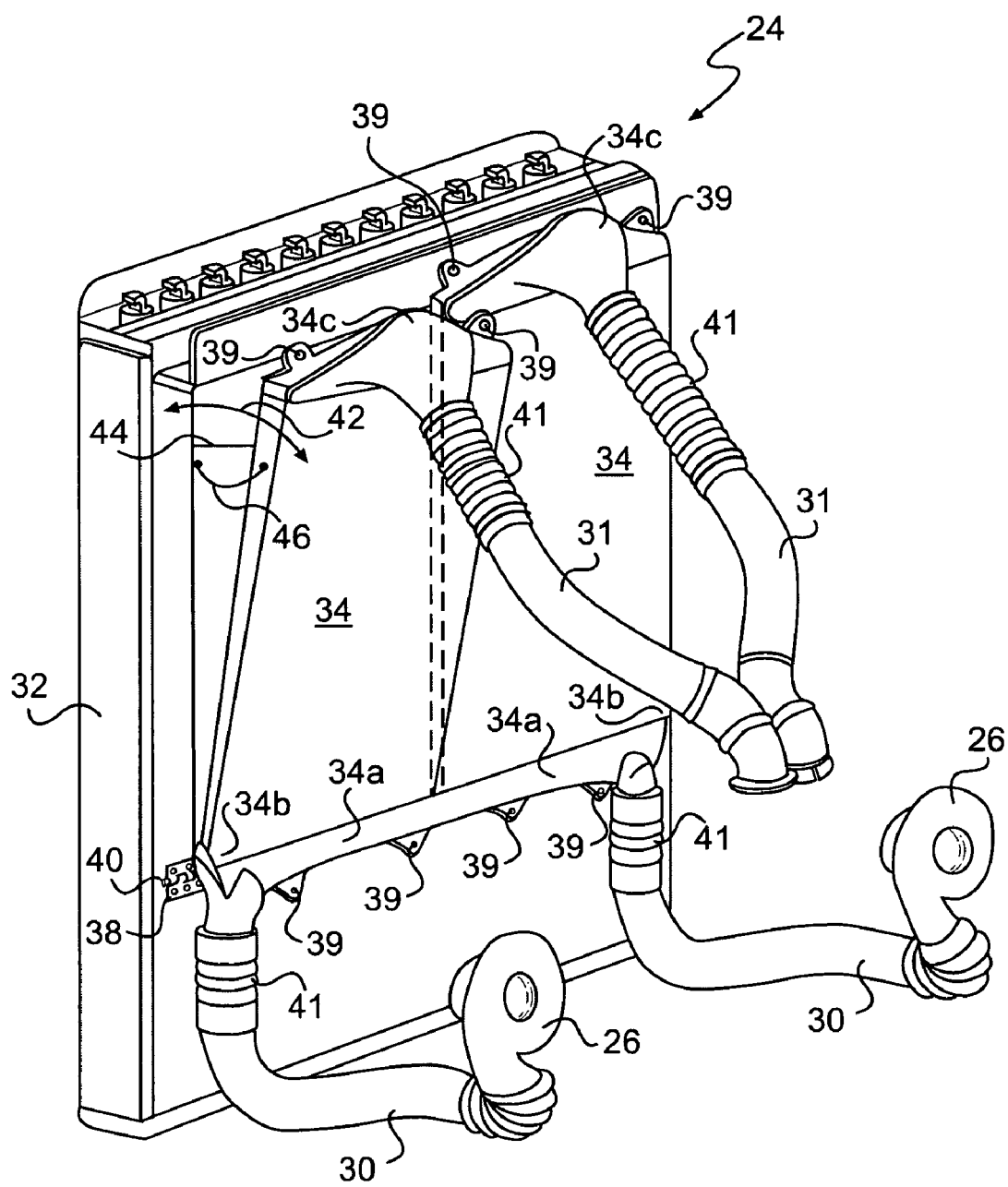
FIG. 2 is a pictorial illustration of an exemplary disclosed heat exchanger arrangement for the cooling system of FIG. 1.

Air-to-air heat exchangers 34 may be fixedly and pivotally connected to liquid-to-air heat exchanger 32. With reference to FIG. 2, each air-to-air heat exchanger 34 may be connected to liquid-to-air heat exchanger 32 by way of a plurality of mounting fasteners 39 and by way of a pivoting hinge member 38 located at a lower edge portion 34a of each air-to-air heat exchanger 34. In order to access the space between air-to-air heat exchangers 34 and liquid-to-air heat exchanger 32, fasteners 39 may be removed and an upper portion 34c of air-to-air heat exchangers 34 selectively pivoted about a pivot axis 40 away from liquid-to-air heat exchanger 32.

Air-to-air heat exchanger 34 may be fluidly connected to engine 12 via first and second fluid conduits 30, 31. In particular, a first fluid conduit 30 may connect one compressor 26 to a lower outer corner portion 34b of each air-to-air heat exchanger 34 to direct pressurized air into air-to-air heat exchangers 34, while a second fluid conduit 31 may connect an upper portion 34c of each air-to-air heat exchanger 34 to inlet ports 28 to direct cooled, pressurized air into combustion chambers 22. First fluid conduits 30 may be vertically connected to lower outer corner portions 34b in the vicinity of pivot axis 40 to minimize the amount of movement experienced by first fluid conduits 30 during pivoting of air-to-air heat exchangers 34 away from liquid-to-air heat exchanger 32. The vertical orientation of the connection between first fluid conduits 30 and air-to-air heat exchangers 34 may allow for air-to-air heat exchangers 34 to be located within close proximity to engine 12. In this configuration, the flow of air through air-to-air heat exchanger 34 may be substantially orthogonal to pivot axis 40.

First and second fluid conduits 30 and 31 may be configured to flex during pivoting of air-to-air heat exchangers 34 toward and away from liquid-to-air heat exchanger 32. In particular, at least a portion 41 of first and second fluid conduits 30 and 31 may be configured to compress and extend during pivoting of air-to-air heat exchangers 34 to accommodate the displacement of upper portions 34c and the reorientation of lower outer portions 34b. Because lower outer portions 34b are located in the vicinity of pivot axis 40 and experience more of a reorienting motion rather than a displacing motion, the portions 41 of second fluid conduits 31 configured to compress and extend may be greater than the compressing and extending portions 41 of first fluid conduits 30.

Second fluid conduits 31 may be disposed along an arc path 42 of upper portion 34c. Specifically, the compressing and extending portions 41 of second fluid conduits 31 may disposed along arc path 42 such that, as air-to-air heat exchangers 34 pivot away from or toward liquid-to-air heat exchanger 32, the compression and extension of second fluid conduits 31 may be primarily axial in nature. It is contemplated that second fluid conduits 31 may be disposed and/or oriented differently than depicted and described, if desired.

The pivoting motion of air-to-air heat exchangers 34 may be limited. In particular, as each air-to-air heat exchangers 34 is pivoted away from liquid-to-air heat exchanger 32, second fluid conduit 31 may compress and thereby exert a force on the pivoting air-to-air heat exchanger 34, urging the air-to-air heat exchangers 34 back toward liquid-to-air heat exchanger 32. To resist the restorative force of second fluid conduit 31 and hold the pivoted air-to-air heat exchangers 34 at a predetermined angle from liquid-to-air heat exchanger 32, a rigid member 44 may be selectively positioning between the pivoting air-to-air heat exchanger 34 and liquid-to-air heat exchanger 32. In addition, a flexible member 46 may connect each air-to-air heat exchanger 34 to liquid-to-air heat exchanger 32 to limit the pivoting of air-to-air heat exchangers 34 to a maximum predetermined angle away from liquid-to-air heat exchanger 32. In this manner, the likelihood of damage caused by air-to-air heat exchanger 34 being pivoted to an excessive angle away from liquid-to-air heat exchanger 32 and against a component of work machine 10 or engine 12 may be minimized.

Fan 36 (referring to FIG. 1) may be disposed proximal to liquid-to-air heat exchanger 32 and configured to produce a flow of air across liquid-to-air heat exchanger 32 and air-to-air heat exchangers 34 for heat transfer. It is contemplated that fan 36 may be omitted if desired, and a secondary fluid circuit (not shown) connected to liquid-to-air heat exchanger 32 to transfer heat to or from the heat transferring liquid for liquid-to-air heat transfer.

INDUSTRIAL APPLICABILITY

The disclosed cooling system may be used in any work machine where access to both sides of a heat exchanger is desired. In particular, the disclosed system provides a simple, reliable way to access the back side of a heat exchanger for maintenance and service purposes. The pivoting and maintenance operation of air-to-air heat exchanger 34 will now be described.

To access the space between air-to-air heat exchanger 34 and liquid-to-air heat exchanger 32, fasteners 39 may first be removed. Following the removal of fasteners 39, air-to-air heat exchanger 34 may be pivoted away from liquid-to-air heat exchanger 32 to an angle less than the maximum allowable angle determined by the length of flexible member 46. To retain air-to-air heat exchanger 34 in the pivoted position against the restorative force of compressed second fluid conduit 31 during the maintenance/service operation, rigid member 44 may be positioned between air-to-air heat exchanger 34 and liquid-to-air heat exchanger 32.

Once air-to-air heat exchanger 34 is retained in the pivoted position, the maintenance activity may be initiated. For example, a service technician may manually remove debris from between air-to-air heat exchanger 34 and liquid-to-air heat exchanger 32, direct a flow of fluid such as compressed air between air-to-air heat exchanger 34 and liquid-to-air heat exchanger 32, inspect and/or repair the opposing surfaces of air-to-air heat exchanger 34 and liquid-to-air heat exchanger 32, or perform any other suitable maintenance/service activities known in the art. Following the maintenance/service activity, rigid member 44 may be removed from between air-to-air heat exchanger 34 and liquid-to-air heat exchanger 32, air-to-air heat exchanger 34 returned to its operational position against liquid-to-air heat exchanger 32, and fasteners 39 reinstalled.

Because all conduits of air induction and cooling systems 22, 24 may remain connected during the maintenance/service activity, the component life of engine 12 may be extended and the time required to perform the activity may be minimized. In particular, because the conduits of air induction and cooling systems 22, 24 may remain connected, the likelihood of debris contamination of engine 12 caused by the maintenance/service activity may be minimized. In addition, because the conduits of air induction and cooling systems 22, 24 remain connected, the time required to access the space between air-to-air heat exchanger 34 and liquid-to-air heat exchanger 32 may be less than if disjointing of the conduits was required.

Because of the position of second fluid conduit 31, the component life of second fluid conduit 31 may be extended. Specifically, because second fluid conduit 31 is located within arc path 42 of air-to-air heat exchanger 34, the compression and extension of second fluid conduit 31 may be primarily axial in nature. By substantially limiting the flexing of second fluid conduit 31 to axial compression and extension, the stresses exerted on second fluid conduit 31 may be minimized, thereby extending the component life of second fluid conduit 31.

It will be apparent to those skilled in the art that various modifications and variations can be made to the disclosed cooling system without departing from the scope of the disclosure. Other embodiments of the cooling system will be apparent to those skilled in the art from consideration of the specification and practice of the cooling system disclosed herein. It is intended that the specification and examples be considered as exemplary only, with a true scope of the disclosure being indicated by the following claims and their equivalents.

What is claimed is:

1. A cooling system, comprising:
    a first heat exchanger pivotal along a pivot axis;
    a first fluid conduit connected to a first end of the first heat exchanger close to the pivot axis;
    a second fluid conduit connected to the first heat exchanger at a second end opposite the first end, wherein the second fluid conduit is located in an outer arc pivot path of the heat exchanger;
    a second heat exchanger connected to the first heat exchanger along the pivot axis;
    wherein the first and second conduits are configured to remain connected to the first heat exchanger during pivoting of the first heat exchanger relative to the second heat exchanger; and
    the second fluid conduit is compressed substantially axially during pivoting of the first heat exchanger away from the second heat exchanger.

2. The cooling system of claim 1, wherein the pivot axis is oriented substantially transverse relative to a flow of fluid through the first heat exchanger.

3. The cooling system of claim 1, wherein the first heat exchanger is an air-to-air heat exchanger and the second heat exchanger is a liquid-to-air heat exchanger.

4. The cooling system of claim 1, further including a third heat exchanger pivotally mounted to the second heat exchanger and disposed in substantially the same plane as the first heat exchanger.

5. The cooling system of claim 1, further including a retention member configured to retain the first heat exchanger in a service position at a predetermined angle away from the second heat exchanger against a restorative compression of the second fluid conduit.

6. The cooling system of claim 5, further including an angle limiting member configured to limit a pivot angle of the second heat exchanger away from the first heat exchanger.

7. The cooling system of claim 6, wherein:
    the retention member includes a rigid member; and
    the angle limiting member includes a flexible member.

8. A power system, comprising:
    a power source having at least one compressor and being configured to produce a power output;
    a first heat exchanger configured to cool fluid circulated through the power source;
    a second heat exchanger pivotally connected to the first heat exchanger along a pivot axis and configured to cool air directed into the power source;
    a first fluid conduit connected to a first end of the second heat exchanger close to the pivot axis, and to the at least one compressor;
    a second fluid conduit connected to the second heat exchanger at a second end opposite the first end and to an air intake of the power source, wherein the first and second conduits remain connected to the second heat exchanger during pivoting of the second heat exchanger;
    a retention member configured to retain the second heat exchanger in a service position at a predetermined angle away from the first heat exchanger against a restorative compression of the second fluid conduit; and an angle limiting member configured to limit a pivot angle of the second heat exchanger away from the first heat exchanger.

9. The power system of claim 8, wherein the second fluid conduit is located in an outer arc pivot path of the second heat exchanger such that the second fluid conduit compresses in a substantially axial direction during pivoting of the second heat exchanger away from the first heat exchanger.

10. The power system of claim 8, further including a third heat exchanger pivotally mounted to the first heat exchanger and disposed in substantially a same plane as the second heat exchanger.

* * * * *